(12) United States Patent
Murakoso et al.

(10) Patent No.: US 8,014,845 B2
(45) Date of Patent: Sep. 6, 2011

(54) INFORMATION TERMINAL DEVICE

(75) Inventors: Junichi Murakoso, Kawasaki (JP);
Tomoyuki Nagamine, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 403 days.

(21) Appl. No.: 12/320,532

(22) Filed: Jan. 28, 2009

(65) Prior Publication Data
US 2009/0286580 A1    Nov. 19, 2009

(30) Foreign Application Priority Data

May 19, 2008    (JP) .................................. 2008-131133

(51) Int. Cl.
*H04M 1/00* (2006.01)
(52) U.S. Cl. ................ 455/575.4; 455/575.3; 455/575.1
(58) Field of Classification Search ............... 455/575.4, 455/575.3, 575.1; 361/814
See application file for complete search history.

(56) References Cited

U.S. PATENT DOCUMENTS

| | | | |
|---|---|---|---|
| 6,766,181 B1* | 7/2004 | Newman et al. ............ | 455/575.3 |
| 7,107,018 B2* | 9/2006 | Jellicoe ........................ | 455/90.3 |
| 7,443,979 B2* | 10/2008 | Kim ........................ | 379/433.12 |
| 7,467,000 B2* | 12/2008 | Shiba ......................... | 455/575.8 |
| 7,499,737 B2* | 3/2009 | Mizuta et al. .............. | 455/575.3 |
| 7,507,044 B2* | 3/2009 | Kemppinen ................. | 400/489 |
| 7,512,427 B2* | 3/2009 | Finke-Anlauff et al. .. | 455/575.1 |
| 7,574,241 B2* | 8/2009 | Ahn et al. ................... | 455/575.1 |
| 7,587,225 B2* | 9/2009 | Kim et al. ................... | 455/575.1 |
| 7,689,257 B2* | 3/2010 | Laaksonen et al. ......... | 455/575.1 |
| 7,711,397 B2* | 5/2010 | Kim ............................ | 455/575.1 |
| 7,884,803 B2* | 2/2011 | Huang .......................... | 345/169 |
| 7,885,693 B2* | 2/2011 | Park et al. ................... | 455/575.4 |
| 7,925,317 B2* | 4/2011 | Lee et al. .................... | 455/575.4 |
| 7,929,285 B2* | 4/2011 | Shen ........................ | 361/679.21 |
| 2005/0070348 A1* | 3/2005 | Lee et al. .................... | 455/575.4 |
| 2005/0130720 A1* | 6/2005 | Finke-Anlauff ........... | 455/575.3 |
| 2005/0288072 A1* | 12/2005 | Kemppinen ............... | 455/575.3 |
| 2006/0063571 A1* | 3/2006 | Chadha ....................... | 455/575.3 |
| 2006/0172786 A1* | 8/2006 | Lo ................................ | 455/575.3 |
| 2006/0211459 A1* | 9/2006 | Kubo .......................... | 455/575.4 |
| 2006/0293093 A1* | 12/2006 | Marcus ...................... | 455/575.3 |
| 2007/0004477 A1* | 1/2007 | Kim ............................ | 455/575.4 |

(Continued)

FOREIGN PATENT DOCUMENTS

JP    2005-341480    12/2005

(Continued)

*Primary Examiner* — Lewis West
(74) *Attorney, Agent, or Firm* — Staas & Halsey LLP (57) ABSTRACT

An information terminal device includes: a first housing that has a first operating unit on a face on one side thereof; a hinge member that is designed to rotate about a first axis, with respect to the first housing; a second housing that has a second operating unit on a face on one side thereof, is provided on one side of the first housing, slides in the direction of a second axis perpendicular to the first axis, and transits between a state where the second housing covers the first operating unit and a state where the first operating unit is exposed, the second housing restricting rotation of the hinge member through contact with the first housing when the second housing is in the covering state; and a third housing that has a display unit on a face on one side thereof, is provided on one side of the second housing, slides in the direction of the first axis, and transits between a state where the third housing covers the second operating unit and a state where the second operating unit is exposed.

6 Claims, 12 Drawing Sheets

U.S. PATENT DOCUMENTS

| | | | |
|---|---|---|---|
| 2007/0037618 A1* | 2/2007 | Lee | 455/575.4 |
| 2007/0146977 A1* | 6/2007 | Choi | 361/680 |
| 2007/0287515 A1* | 12/2007 | Fagrenius et al. | 455/575.4 |
| 2008/0161075 A1* | 7/2008 | Kim et al. | 455/575.4 |
| 2008/0234014 A1* | 9/2008 | Kim et al. | 455/575.4 |
| 2009/0170573 A1* | 7/2009 | Harmon et al. | 455/575.4 |

FOREIGN PATENT DOCUMENTS

| | | |
|---|---|---|
| JP | 2006-178924 | 7/2006 |
| JP | 2007-179525 | 7/2007 |
| JP | 2007-180853 | 7/2007 |
| JP | 2007-518155 | 7/2007 |
| WO | WO 2005/052777 A2 | 6/2005 |

* cited by examiner

| | PLACEMENT | ON STATE |
|---|---|---|
| FIRST DETECTION SENSOR | BETWEEN FIRST HOUSING AND SECOND HOUSING | EXPOSING FULL KEYBOARD |
| SECOND DETECTION SENSOR | BETWEEN SECOND HOUSING AND THIRD HOUSING | EXPOSING NUMERIC KEYPAD |
| THIRD DETECTION SENSOR | BETWEEN FIRST HOUSING AND OPEN/CLOSE HINGE ATTACHMENT UNIT | TILTING AT PREDETERMINED ANGLE |

FIG. 12B

| FIRST DETECTION SENSOR | SECOND DETECTION SENSOR | THIRD DETECTION SENSOR | STATE OF SMARTPHONE | APPLICATION TO BE ACTIVATED |
|---|---|---|---|---|
| OFF | OFF | OFF | FIRST STATE | SLEEP |
| ON | OFF | OFF | SECOND STATE | MENU SCREEN |
| OFF | ON | OFF | THIRD STATE | ADDRESS BOOK |
| ON | ON | OFF | FOURTH STATE | MENU SCREEN |
| ON | OFF | ON | FIFTH STATE | TV VIEW APPLICATION, OR THE LIKE |
| ON | ON | ON | SIXTH STATE | TV VIEW APPLICATION, OR THE LIKE |

INFORMATION TERMINAL DEVICE

CROSS-REFERENCE TO RELATED APPLICATION

This application is based upon and claims the benefit of priority of the prior Japanese Patent Application No. 2008-131133, filed on May 19, 2008, the entire contents of which are incorporated herein by reference.

FIELD

The present invention generally relates to an information terminal device. The present invention, for example, relates to an information terminal device such as a portable telephone device (a smartphone), a PHS terminal, or a PDA.

BACKGROUND

In recent years, information terminal devices such as portable telephone devices have not only a verbal communication function but also a number of other functions such as an Internet function, an e-mail function, a digital camera function, a recorded sound reproducing function, a video viewing function, and a schedule management function. Also, there are terminals (smartphones) similar to small-sized personal computers, having a TV (one-segment broadcasting) reception function, a full keyboard (a QWERTY keyboard) that facilitates e-mail creation, the SNS, blogging, and text inputs into business applications and the likes, and a high-speed communication function.

Such an information terminal device may have a foldable housing that can change its total length, or a slidable housing, so as to increase the operability at the time of a verbal communication and increase the usability when the information terminal device is carried around.

In a case where a foldable housing is employed, the display screen (the display) is a portrait-oriented screen. Therefore, when a TV program or a video is viewed, the display should be turned on its side. Recently, information terminals (portable telephone devices) that have the mechanism for rotating the display 90° have been developed.

In a case where a slidable housing is employed in an information terminal (particularly, a smartphone), the structure disclosed in Published Japanese Translation No. 2007-518155 of the PCT international publication for a patent application. In this document, a device is formed with first through third module layers. The sliding direction of the second module layer with respect to the first module layer differs from the sliding direction of the third module layer with respect to the second module layer.

Further, smartphones (such as EMONSTER (S11HT) of EMOBILE Ltd.) have recently appeared on the market. Such a smartphone has a second housing slidably connected to a first housing having a full keyboard. The second housing has a display. The second housing can tilt with respect to the first housing.

However, the device disclosed in Published Japanese Translation No. 2007-518155 and the smartphones that have recently appeared on the market do not fully satisfy the demands of users.

For example, in the device disclosed in Published Japanese Translation No. 2007-518155, the display cannot form a desired angle when a TV program (one-segment broadcasting) is to be viewed while the device is placed on a desk or the like. Therefore, it is necessary to prepare a sloping base, so as to set the display at the desired angle. Also, the display is set at a desired angle when an input is to be made through the full keyboard.

Also, to achieve a small-size device and a large-size display at the same time like the smartphones that have recently appeared on the market, a large number of buttons cannot be arranged on the housing carrying the display. Also, to achieve a small size, there are many cases where only a full keyboard without numeric keys is provided. In such cases, numbers need to be input by combining function keys and particular keys, for example.

Therefore, to change channels while viewing a TV program, or to input a number directly to spreadsheet software or the like, it is necessary to use a full keyboard and cursor keys. The user friendliness in such cases is not very high.

SUMMARY

According to an aspect of the present invention, there is provided an information terminal device including: a first housing that has a first operating unit on a face on one side thereof; a hinge member that is designed to rotate about a first axis, with respect to the first housing; a second housing that has a second operating unit on a face on one side thereof, is provided on one side of the first housing, slides in a direction of a second axis perpendicular to the first axis, and transits between a state where the second housing covers the first operating unit of the first housing and a state where the first operating unit is exposed, the second housing restricting rotation of the hinge member through contact with the first housing when the second housing is in the state where the second housing covers the first operating unit of the first housing; and a third housing that has a display unit on a face on one side thereof, is provided on one side of the second housing, slides in the direction of the first axis, and transits between a state where the third housing covers the second operating unit of the second housing and a state where the second operating unit is exposed.

DESCRIPTION OF EMBODIMENTS

Referring now to FIGS. 1A through 12B, an embodiment of an information terminal device of the present invention is described in detail. FIGS. 1A through 1C and FIGS. 2A through 2C are perspective views of a smartphone 100 as the information terminal device of this embodiment. In the following, the longitudinal direction (the length direction) of the display screen 16 of the smartphone 100 is defined as the Y-axis direction, the transverse direction (the width direction) is the X-axis direction, and the direction perpendicular to the display screen 16 (the thickness direction) is the Z-axis direction, for ease of explanation.

Figure 1A:
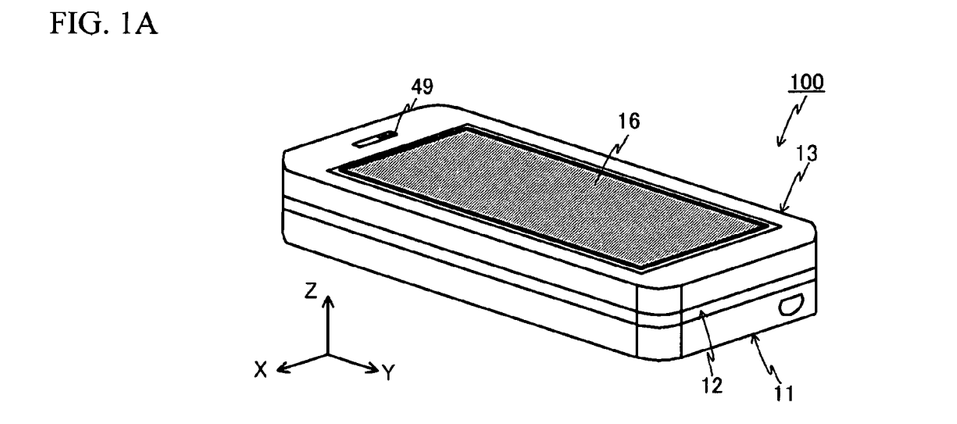
FIGS. 1A through 1C are perspective views of a smartphone in a first state, a second state, and a third state in accordance with an embodiment of the present invention.
Figures 1B, 1C:
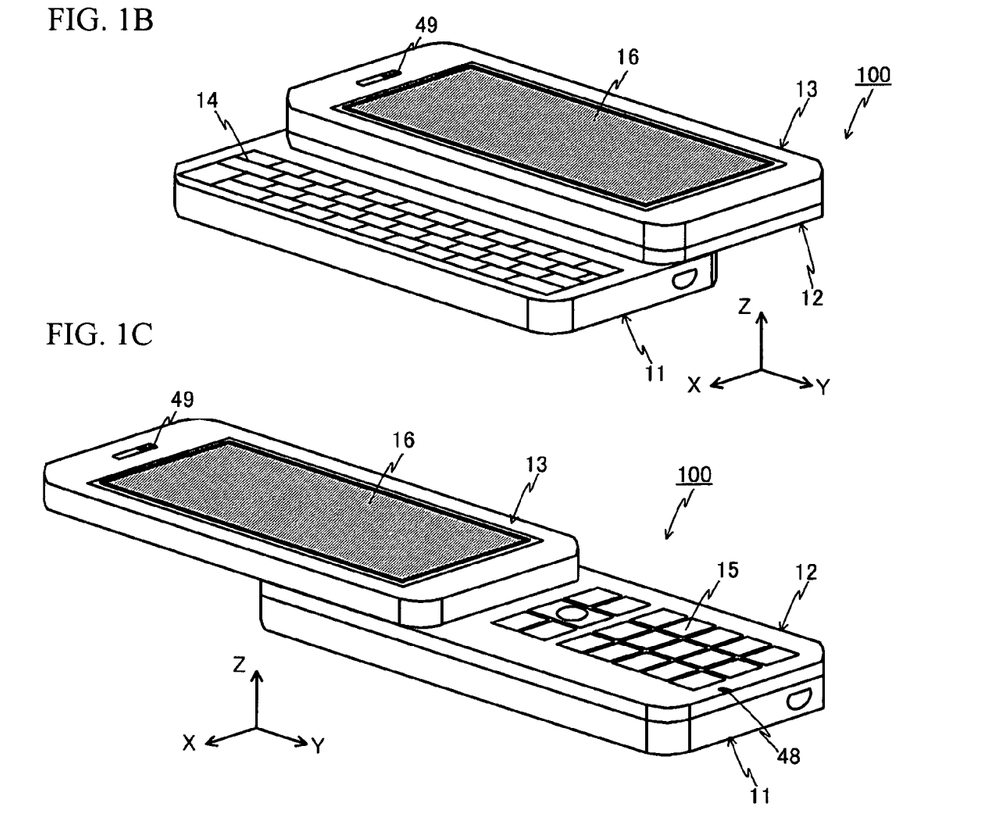
Figure 2A:
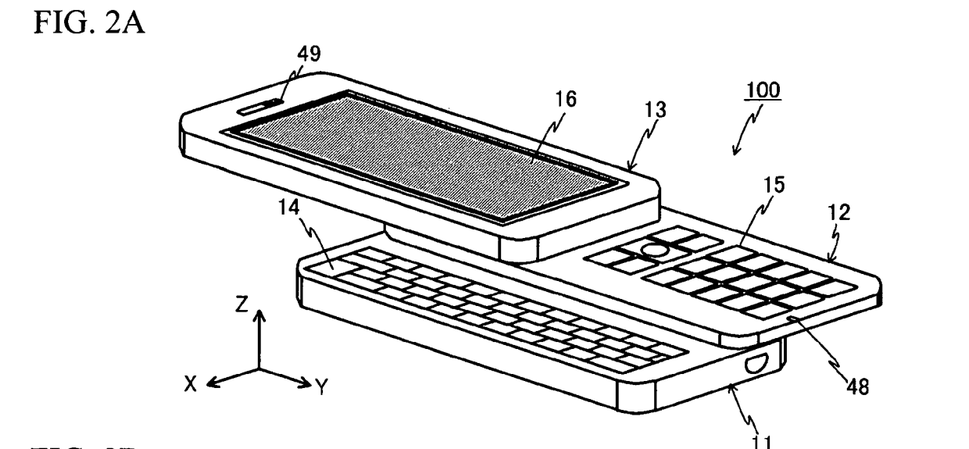
FIGS. 2A through 2C are perspective views of the smartphone in a fourth state, a fifth state, and a sixth state in accordance with the embodiment of the present invention.
Figures 2B, 2C:
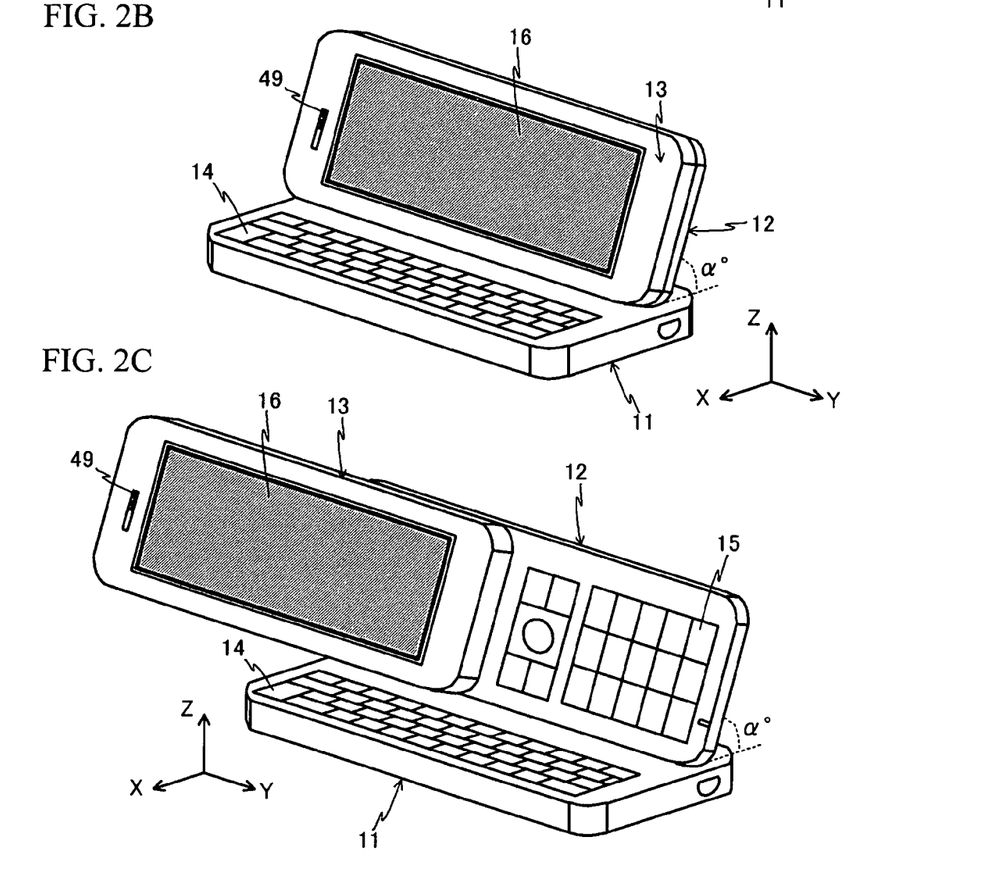

The smartphone 100 can transit (transform) among the following states: the first state depicted in FIG. 1A, the second state depicted in FIG. 1B, the third state depicted in FIG. 1C, the fourth state depicted in FIG. 2A, the fifth state depicted in FIG. 2B, and the sixth state depicted in FIG. 2C.

Of those states, the first state depicted in FIG. 1A is a state where a first housing 11, a second housing 12, and a third housing 13 are stacked. More specifically, in the first state, the second housing 12 covers first operation buttons (a full keyboard) 14 (see FIG. 1B), and the third housing 13 covers second operation buttons (a numeric keypad) 15 (see FIG. 1C). In the first state, the total length (the size in the Y-axis direction (the length direction)) and the total width (the size in the X-axis direction) of the smartphone 100 are the smallest. Accordingly, when the smartphone 100 is carried around, there is a high possibility that the smartphone 100 is set in the first state.

The second state depicted in FIG. 1B is a state where the second housing 12 slides in the −X direction from the position at which the second housing 12 is located in the first state depicted in FIG. 1A, and the total width (the width in the X-axis direction) of the smartphone 100 becomes the largest. In the second state, the first operation buttons (the full keyboard) 14 of the first housing 11 appear (become exposed), and can be seen from above (from the +Z direction). Accordingly, when an outgoing message is written with the full keyboard 14 or a document is created or the like, there is a high possibility that the smartphone 100 is set in the second state.

The third state depicted in FIG. 1C is a state where the third housing 13 slides in the −Y direction from the position at which the third housing 13 is located in the first state depicted in FIG. 1A, and the total length of the smartphone 100 in the Y-axis direction (the longitudinal direction) becomes the largest. In the third state, the second operation buttons (the numeric keys and cursor keys (hereinafter referred to simply as the "ten-key keypad") 15 of the second housing 12 appear (become exposed). Accordingly, when a call is made, there is a high possibility that the smartphone 100 is set in the third state.

The fourth state depicted in FIG. 2A is a state where the second housing 12 (together with the third housing 13) slides in the −X direction with respect to the first housing 11 from the position at which the second housing 12 is located in the third state depicted in FIG. 1C. In this state, the full keyboard 14 and the ten-key keypad 15 appear (become exposed). Therefore, when an operation is performed with the use of those operation buttons (when an input is made with the use of both the full keyboard 14 and the ten-key keypad 15, or when an input is made into e-mail software, spreadsheet software, word-processing software, or the like), the smartphone 100 is set in the fourth state. With the angle of the display screen 16 and the full keyboard 14 in the fourth state being into consideration, there is a high possibility that the smartphone 100 is set in the fourth state, when the user holds the entire smartphone 100 by hand and performs one of the above operations.

The fifth state depicted in FIG. 2B is a state where the second housing 12 tilts by an angle α° from the position at which the second housing 12 is located in the second state depicted in FIG. 1B. In this state, the display screen 16 on the third housing 13 can be set at an appropriate angle. Therefore, there is a high possibility that the smartphone 100 is set in the fifth state, when the user watches a TV program, makes an input into e-mail software, spreadsheet software, word-processing software, or the like, or views pages on the Internet, while the smartphone 100 stands on a desk or the like.

The sixth state depicted in FIG. 2C is a state where the second housing 12 (together with the third housing 13) tilts by an angle α from the position at which the second housing 12 is located in the fourth state depicted in FIG. 2A. In this state, the display screen 16 on the third housing 13 can be set at an appropriate angle. Therefore, the smartphone 100 is set in the sixth state, when the user watches a TV program, makes an input into e-mail software, spreadsheet software, word-processing software, or the like, while the smartphone 100 stands on a desk or the like. The sixth state can also be regarded as a state where the first housing 11 slides in the −Y direction with respect to the second housing 12 from the position at which the first housing 11 is located in the fifth state depicted in FIG. 2B. Since the ten-key keypad 16 is exposed in the sixth state, the user can directly change channels when watching a TV program, or can directly designate a chapter when replaying a video.

Referring now to FIGS. 3 through 10C, the structure of the smartphone 100 is described in detail.

Figure 3:
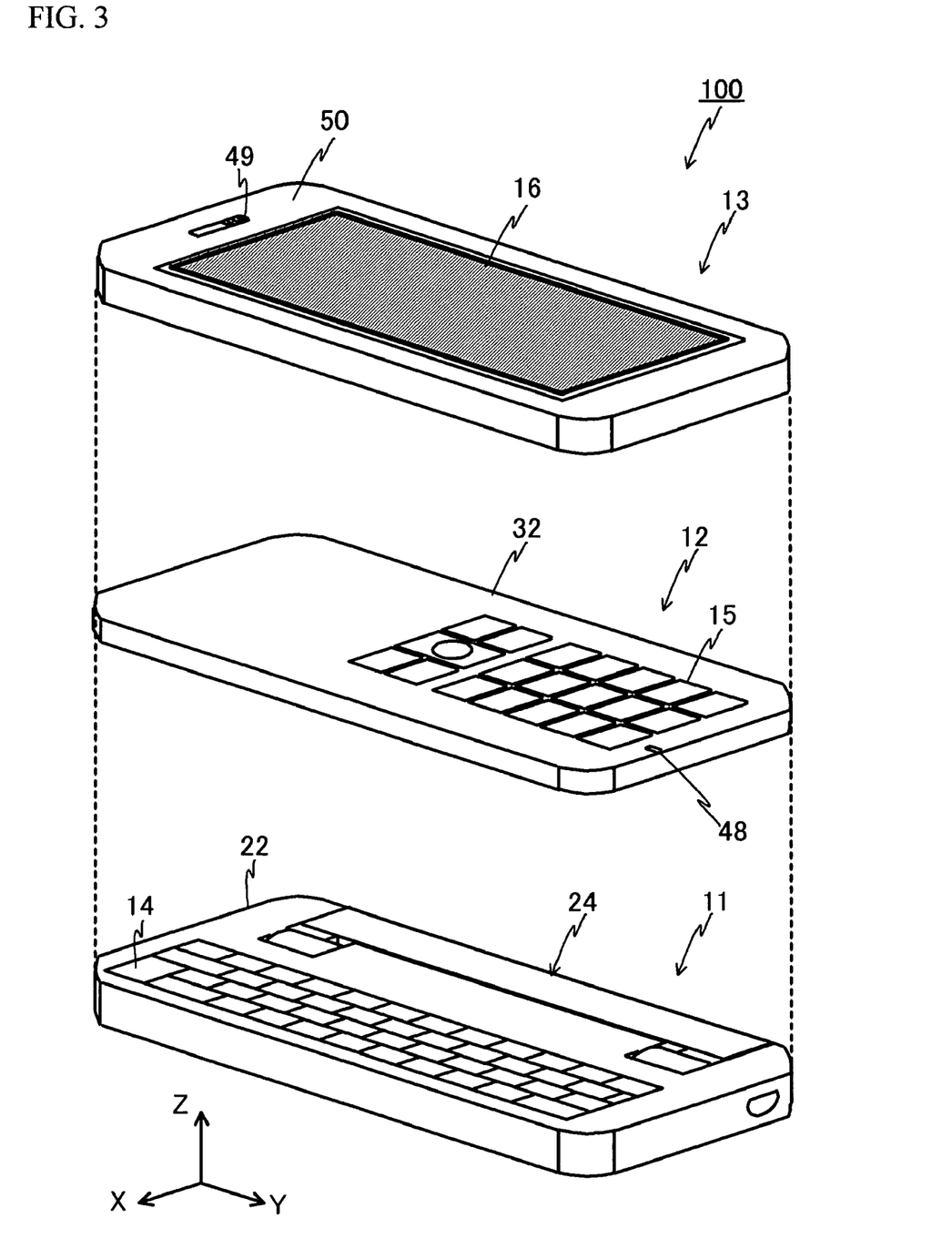
FIG. 3 is an exploded perspective view of the smartphone in accordance with the embodiment.
Figure 4:
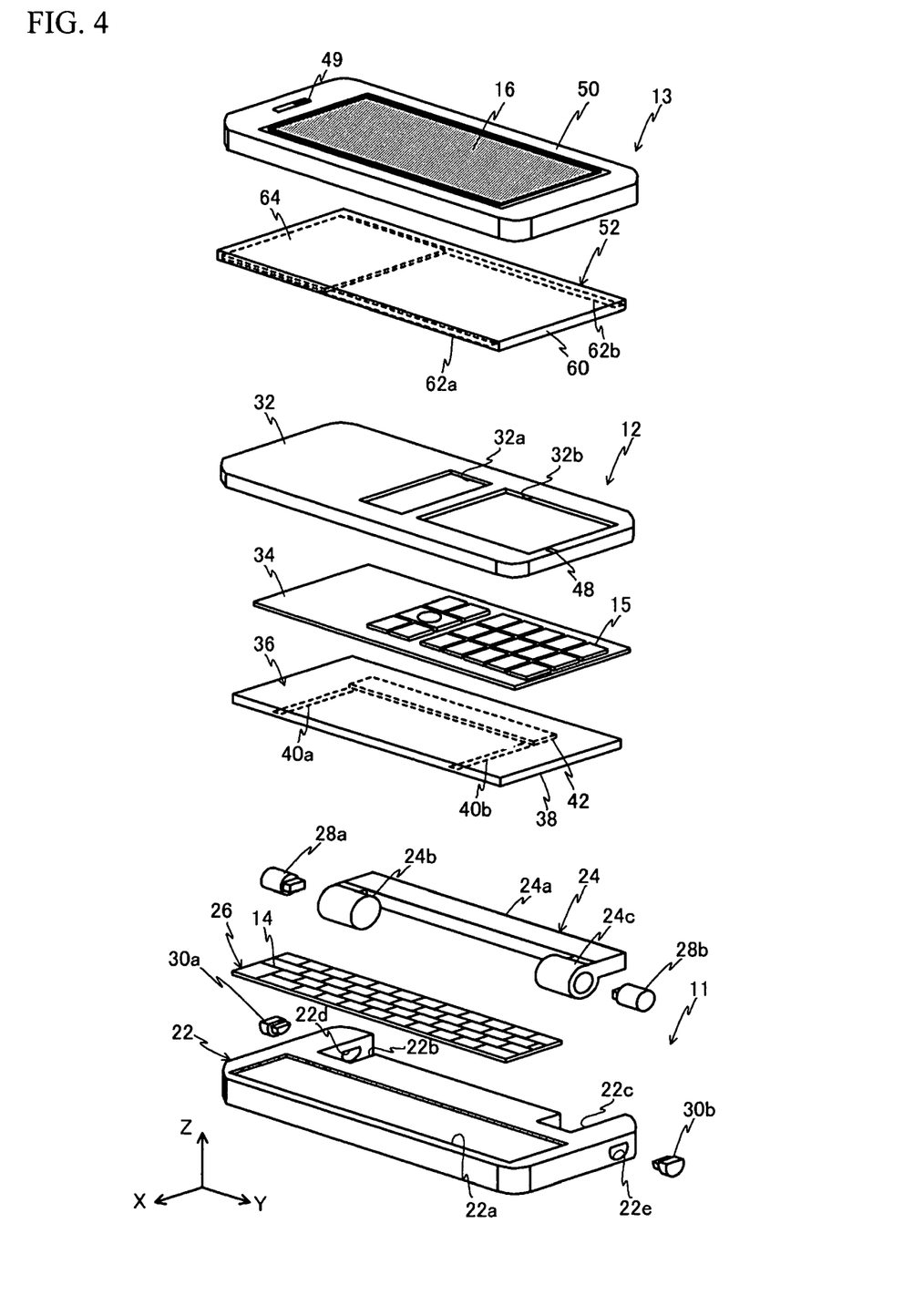
FIG. 4 is a more minutely exploded perspective view of the smartphone.

FIG. 3 is an exploded perspective view of the first through third housings (11 through 13) of the smartphone 100 of this embodiment. FIG. 4 is an exploded perspective view more closely illustrating the respective housings depicted in FIG. 3.

As depicted in FIG. 3, the first housing 11 includes a first housing main body 22 and the full keyboard 14. The first housing main body 22 has a flat rectangular parallelepiped shape, with the sidewall portions on the −X side being cut off. The full keyboard 14 is of the QWERTY type, and is provided on the outer face (the face on the +Z side) of the first housing main body 22. An open/close hinge attachment unit 24 as a hinge member is also provided on the −X-side end portion of the first housing main body 22.

The first housing main body 22 has a battery pack, a printed circuit board, an IC chip, and the likes inside. As depicted in FIG. 4, a rectangular concave portion 22a is formed in the outer face (the face on the +Z side) of the first housing main body 22. A key module 26 including the full keyboard 14 is set in the rectangular concave portion 22a. Further, concave portions 22b and 22c, and through holes 22d and 22e are formed in the first housing main body 22.

The open/close hinge attachment unit 24 includes a plate-like portion 24a having the Y-axis direction as its longitudinal direction, an attachment portion 24b of a cylindrical shape (a cylindrical structure with a bottom) placed in the vicinity of the +Y-side end portion of the plate-like portion 24a, and an attachment portion 24c of a cylindrical shape (a cylindrical structure with a bottom) placed in the vicinity of the −Y-side end portion of the plate-like portion 24a. It is preferable that the longest possible distance is kept between the attachment portions 24b and 24c, so that a large number of components can be placed between the attachment portions 24b and 24c (within the first housing main body 22).

The attachment portions 24b and 24c of the open/close hinge attachment unit 24 are engaged with the concave portions 22b and 22c of the first housing main body 22. Hinge modules 28a and 28b are inserted into the attachment portions 24b and 24c via the through holes 22d and 22e. In this manner, the open/close hinge attachment unit 24 is rotatably fixed to the first housing main body 22. Here, known hinge modules having angles that can be adjusted in a stepless manner are employed as the hinge modules 28a and 28b. Further, a lock mechanism may be provided on the hinge modules 28a and 28b, so that a light lock is established when the upper face of the plate-like portion 24a of the open/close hinge attachment unit 24 forms an angle α (α being 60°, for example) with respect to the upper face of the first housing 11. As the hinge modules 28a and 28b, it is also possible to employ known hinge modules having angles that can be adjusted stepwise.

After the open/close hinge attachment unit 24 is fixed to the first housing main body 22, the through holes 22d and 22e of the first housing main body 22 are blocked with hinge caps 30a and 30b.

The second housing 12 includes a casing member 32 as a housing main body having a rectangular shape when seen on a plan view (or seen from above), a key module 34 including the ten-key keypad 15 and a printed circuit board, and a horizontal slide mechanism 36 having a rectangular shape when seen on a plan view (or seen from above).

A microphone unit 48 is provided at the +Y-side end portion of the face on the +Z side of the casing member 32. The microphone unit 48 includes a microphone placed inside the second housing 12. Through holes 32a and 32b that are different in size from each other are also formed in the casing member 32, as depicted in FIG. 4. The ten-key keypad 15 of the key module 34 is positioned to the through holes 32a and 32b, so that access from above the casing member 32 can be made to the ten-key keypad 15. The horizontal slide mechanism 36 is fixed to the back face (on the −Z side) of the casing member 32, with the key module 34 being interposed between the horizontal slide mechanism 36 and the casing member 32.

Figure 5:
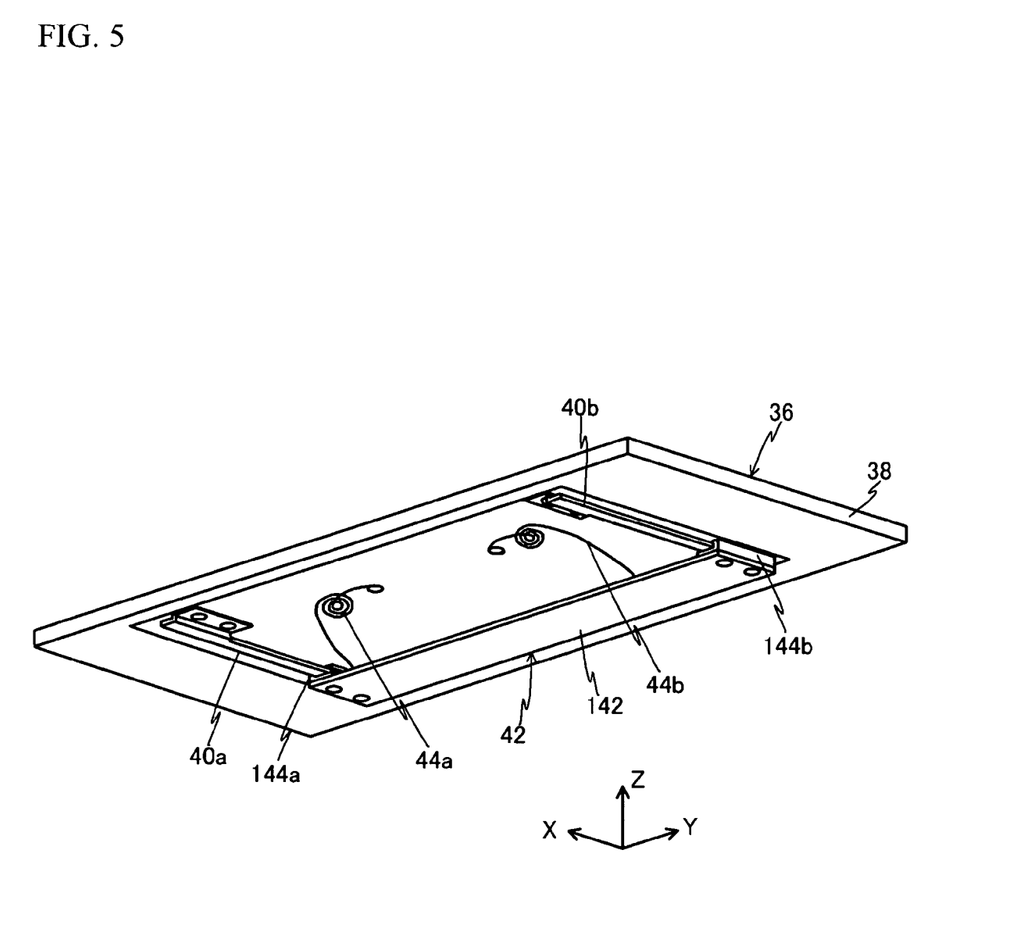
FIG. 5 is a perspective view of the horizontal slide mechanism, seen from the −Z side.

FIG. 5 is a perspective view illustrating the horizontal slide mechanism 36, seen from the −Z side. As depicted in FIG. 5, the horizontal slide mechanism 36 includes a rectangular plate-like main member 38, a pair of rail members 40a and 40b, a slider 42 engaged with the pair of rail members 40a and 40b, and a biasing member (torsion coil springs 44a and 44b). The width of the slider 42 in the X-axis direction is made smaller than the size acquired by subtracting the width of the full keyboard 14 in the X-axis direction from the width of the first housing 11 in the X-axis direction.

Of the pair of rail members 40a and 40b, the rail member 40a is screwed in the vicinity of the −Y-side end portion of the lower face (the face on the −Z side) of the main member 38, and extends in the X-axis direction. The other rail member 40b is provided in the vicinity of the +Y-side end portion of the lower face of the main member 38, and extends in the X-axis direction.

The slider 42 includes a rectangular plate-like slider main body 142, an engaging portion 144a that is provided at the −Y-side end portion of the slider main body 142 and has a U-shape in cross section, and an engaging portion 144b that is provided at the +Y-side end portion of the slider main body 142 and has a U-shape in cross section. The engaging portions 144a and 144b may be made of lubricant plastic (such as polyacetal). The engaging portion 144a of the slider 42 is engaged with the rail member 40a, and the engaging portion 144b is engaged with the rail member 40b. With this arrangement, the slider 42 can slide on the rail members 40a and 40b in the X-axis direction. In this case, the slider 42 can slide in a stable manner, as the two rail members 40a and 40b are used.

Figure 6A:
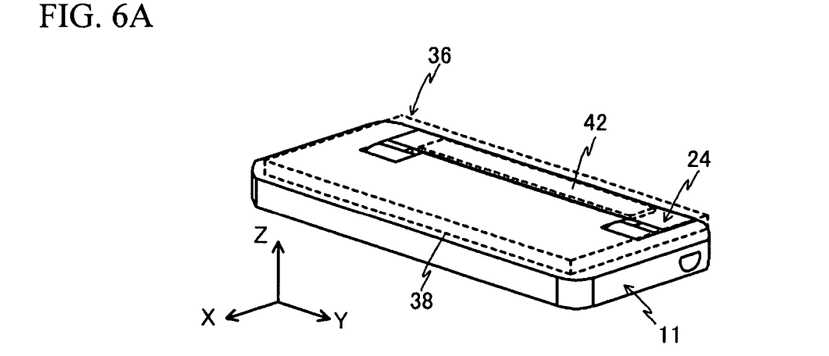
FIGS. 6A through 6D illustrate the operation of the horizontal slide mechanism.

As depicted in FIG. 6A, the slider main body 142 of the slider 42 is fixed onto the upper face (the face on the +Z side) of the open/close attachment unit 24. Accordingly, in the fixed state, the main body member 38 (and the rail members 40a and 40b) can slide in the X-axis direction with respect to the slider 42 and the open/close hinge attachment unit 24, as depicted in FIGS. 6A through 6C.

In the horizontal slide mechanism 36, the torsion coil springs 44a and 44b are provided to join the main member 38 to the slider 42, as depicted in FIG. 5. Accordingly, in the situation depicted in FIG. 6A, the torsion coil springs 44a and 44b generate biasing force in the +X-axis direction. When the user causes the second housing 12 to slide to a predetermined position as depicted in FIG. 6B, biasing force is generated in the −X-axis direction by the change in the positions (the shapes) of the torsion coil springs 44a and 44b. Accordingly, when the user moves the second housing 12 to the position depicted in FIG. 6B, the second housing 12 automatically moves to the −X-side end portion of the movable range (the range in which the slider 42 can slide on the rail members 40a and 40b) of the second housing 12 depicted in FIG. 6C.

Figure 6B:
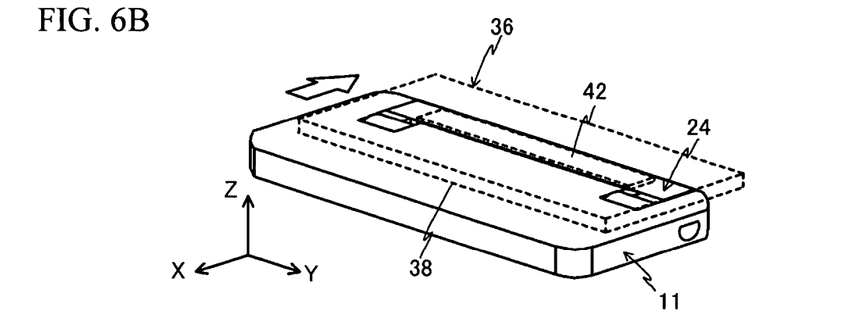

Even if the user tries to rotate the second housing 12 together with the open/close hinge attachment unit 24 in the situation depicted in FIG. 6A or 6B, the rotation is hindered by the contact between the second housing 12 and the first housing 11. When the second housing 12 moves to the position depicted in FIG. 6C, on the other hand, the second housing 12 and the open/close hinge attachment unit 24 can be rotatively moved, without any hindrance by the contact between the first housing 11 and the second housing 12, as depicted in FIG. 6D.

Figure 6C:
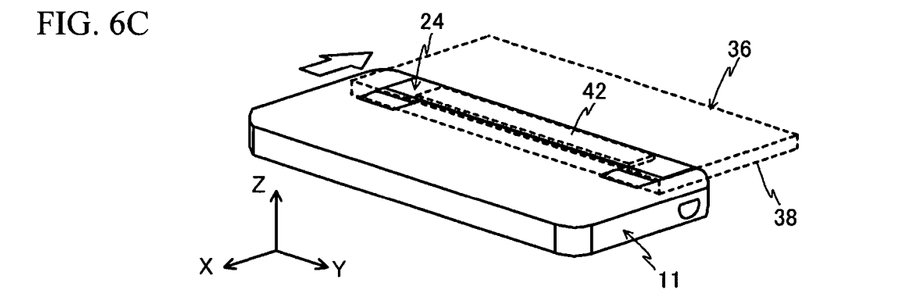
Figure 6D:
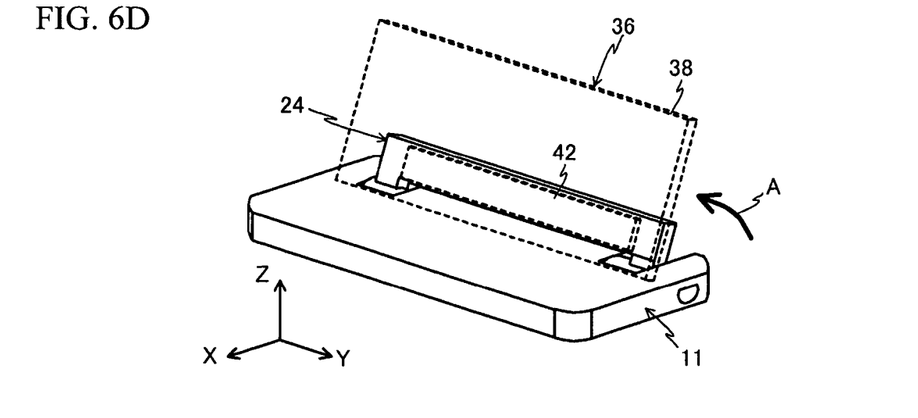

To return the second housing 12 from the position depicted in FIG. 6C to the position depicted in FIG. 6A, the opposite operation from the above should be performed. More specifically, the user applies the +X-direction force to the second housing 12 located in the position depicted in FIG. 6C, so as to return the second housing 12 to the position depicted in FIG. 6B. The second housing 12 then automatically returns to the position depicted in FIG. 6A, by virtue of the torsion coil springs 44a and 44b.

Referring back to FIGS. 3 and 4, the third housing 13 includes a panel member 50 and a vertical slide mechanism 52 that is fixed to the back face (on the −Z side) of the panel member 50.

The display screen (the display) 16 is placed at the center of the outer face (on the +Z side) of the panel member 50, and a receiver unit 49 is provided on the −Y side of the display screen 16. The receiver screen 16 includes a speaker built inside the panel member 50.

Figure 7:
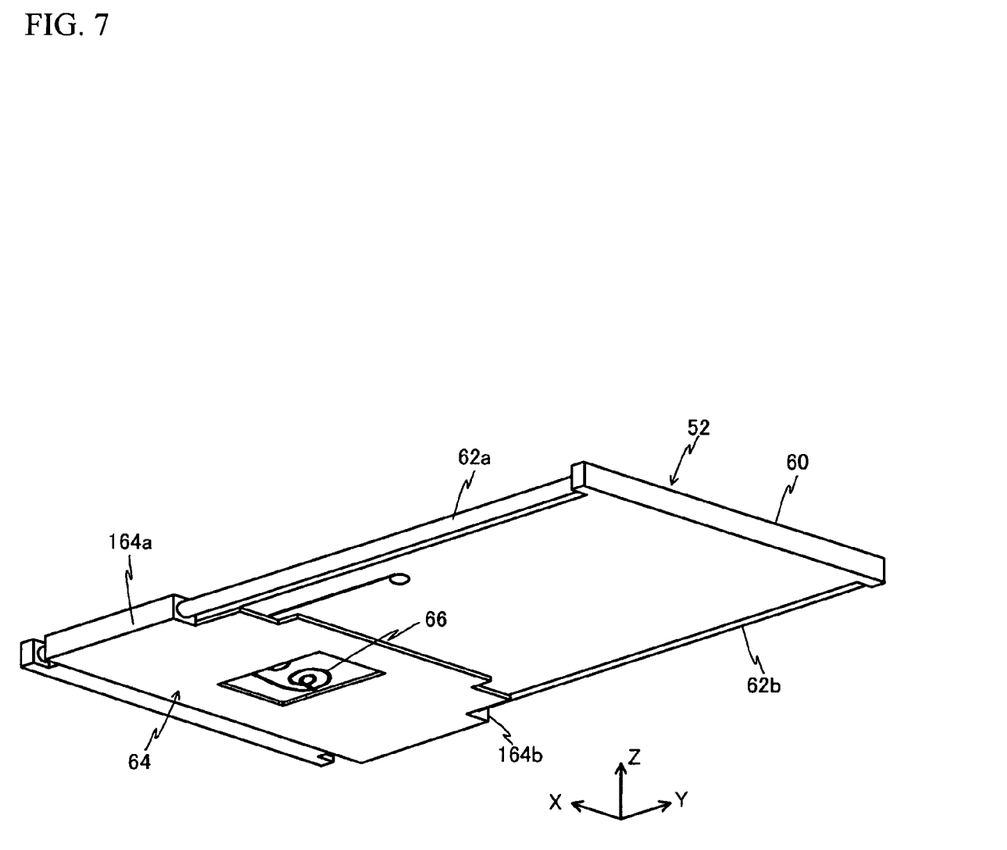
FIG. 7 is a perspective view of the vertical slide mechanism, seen from the −Z side.

FIG. 7 is a perspective view illustrating the vertical slide mechanism 52, seen from below. As depicted in FIG. 7, the vertical slide mechanism 52 includes a frame 60, a pair of rail members 62a and 62b, a slider 64, and a biasing member (a torsion coil spring 66). In this embodiment, a torsion coil spring of two turns is used as the torsion coil spring.

The frame 60 has a rectangular plate-like shape. The rail member 62a is provided at the end portion of the +X side of the frame 60, and the rail member 62b is provided at the end portion of the −X side of the frame 60. The rail members 62a and 62b each have a cylindrical shape (a pole-like shape), and extend in the Y-axis direction with respect to the frame 60.

The slider 64 has an engaging portion 164a formed at its +X-side end portion, and an engaging portion 164b formed at its −X-side end portion. The engaging portions 164a and 164b are rectangular parallelepiped portions having through holes of circular shapes in cross section, for example. The rail members 62a and 62b can penetrate through the through holes. The slider 64 (especially the engaging portions 164a and 164b) may be made of lubricant plastic (such as polyacetal), for example. The rail members 62a and 62b are inserted into the engaging portions 164a and 164b(the through holes) of the slider 64, so that the slider 64 is slidably secured to the frame 60. In this case, being supported by the two rail members 62a and 62b, the slider 64 can be held in a stable state.

Figure 8A:
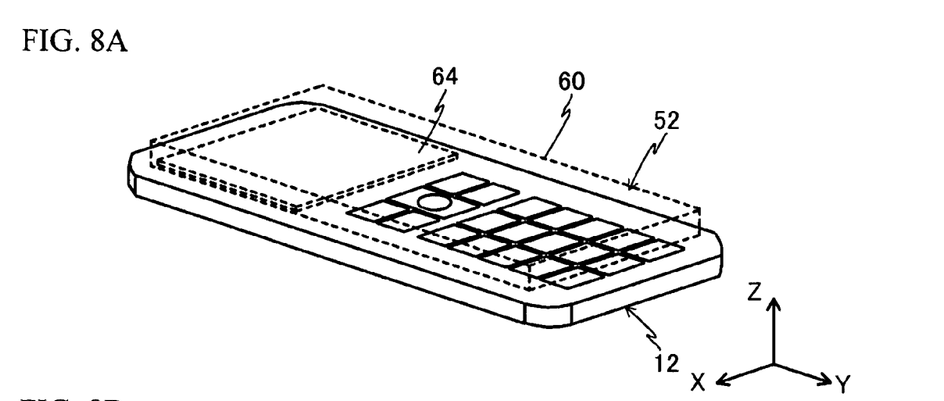
FIGS. 8A through 8C illustrate the operation of the vertical slide mechanism.

In the vertical slide mechanism 52 having the above structure, the slider 64 is fixed to the portion on the −Y side of the outer face (the +Z side) of the second housing 12, as depicted in FIG. 8A. Accordingly, in the fixed state, the frame 60 (together with the rail members 62a and 62b) can slide freely with respect to the slider 64.

In the situation illustrated in FIG. 8A, the torsion coil spring 66 generates biasing force to move the first housing 11 in the +Y direction with respect to the slider 64. When the user applies force to the first housing 11 (the frame 60) to counter the biasing force in this situation, and moves the first housing 11 (the frame 60) in the −Y direction, the position (the shape) of the torsion coil spring 66 changes in the vicinity of the location depicted in FIG. 8B. As a result, the torsion coil spring 66 generates biasing force in the opposite direction (the −Y direction).

Figure 8B:
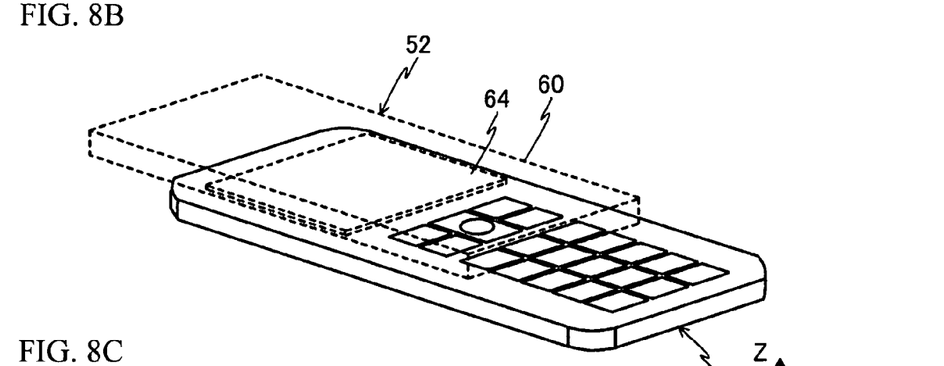
Figure 8C:
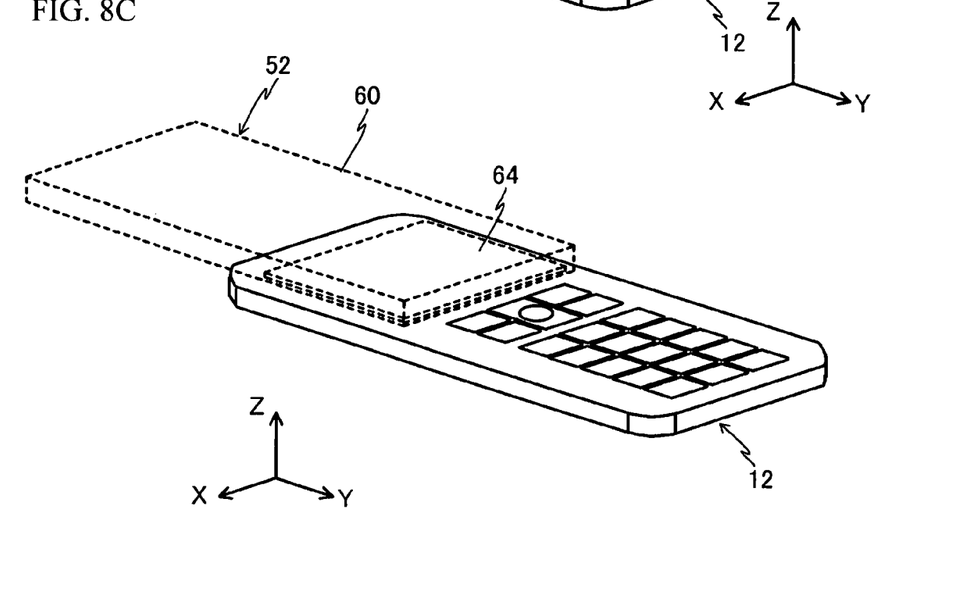

In this manner, after the situation depicted in FIG. 8B, the first housing 11 (the frame 60) automatically slides to the position depicted in FIG. 8C, even if the user does not apply any force to the first housing 11 (the frame 60).

As the smartphone 100 of this embodiment as the above structure, the second housing 12 can slide and tilt with respect to the first housing 11, and the third housing 13 can slide with respect to the second housing 12. Accordingly, the smartphone 100 can change its form between the first state and the sixth state, as illustrated in FIGS. 1A through 2C.

Figure 9A:
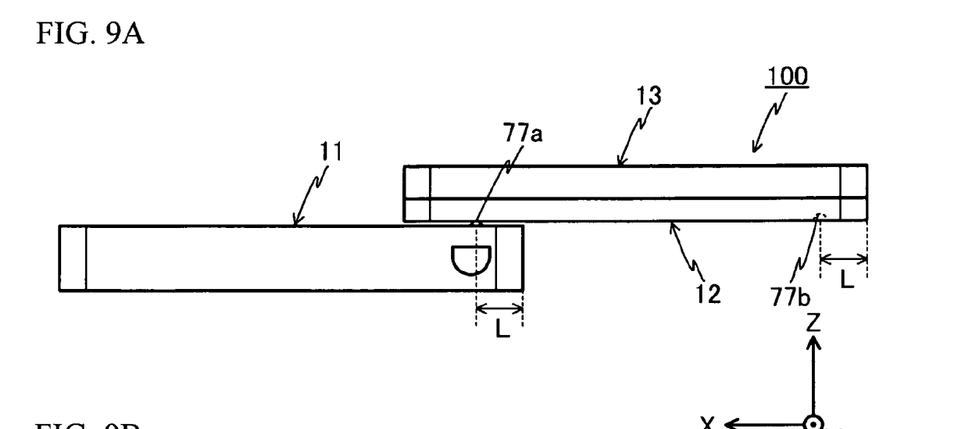
FIGS. 9A through 9C illustrate the structure and effects of press fit plungers.
Figure 9B:
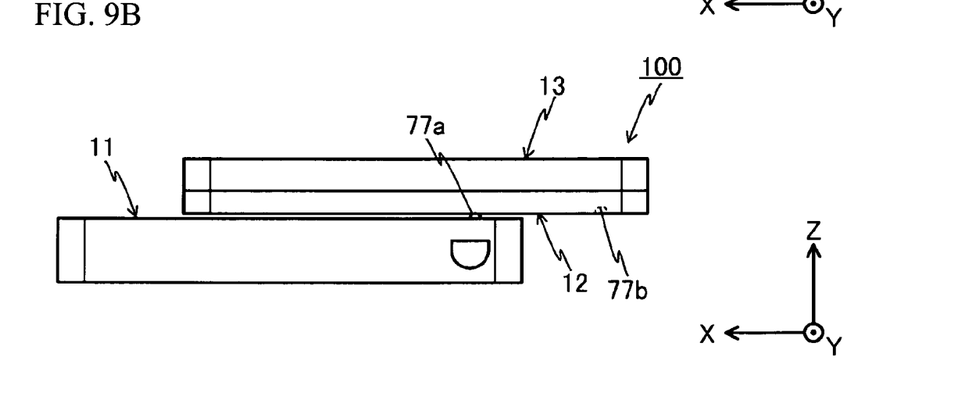
Figure 9C:
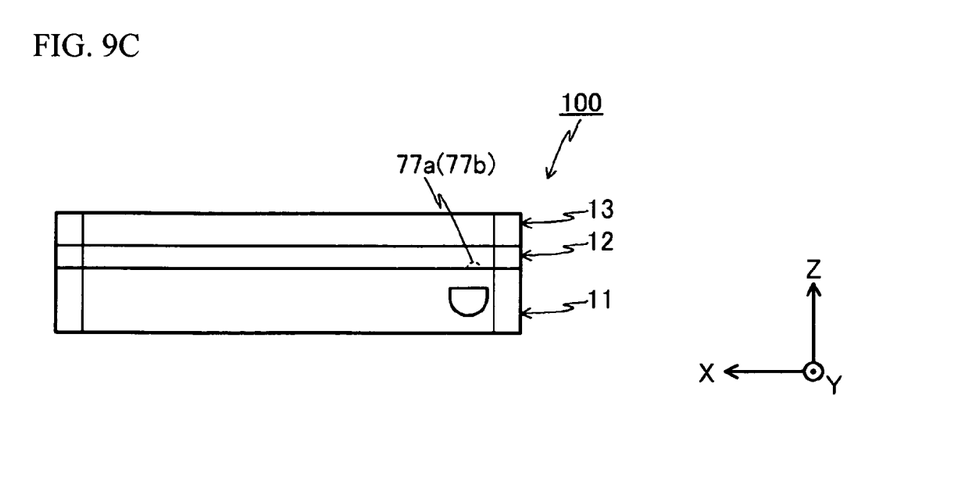
Figure 10A:
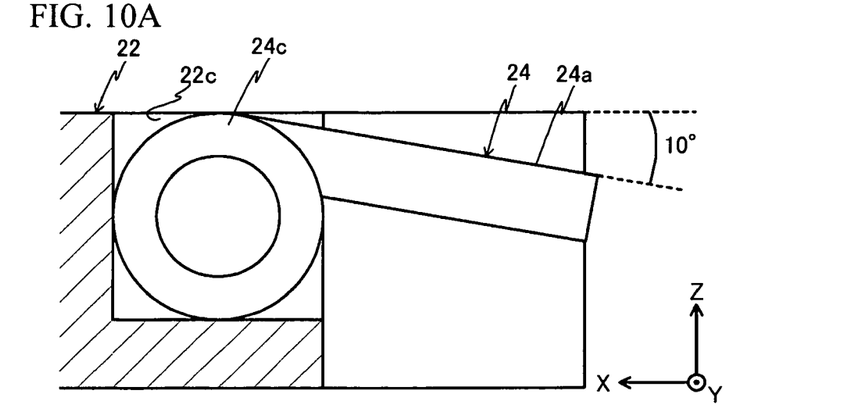
FIGS. 10A through 10C illustrate the method of attaching the open/close hinge attachment unit.
Figure 10B:
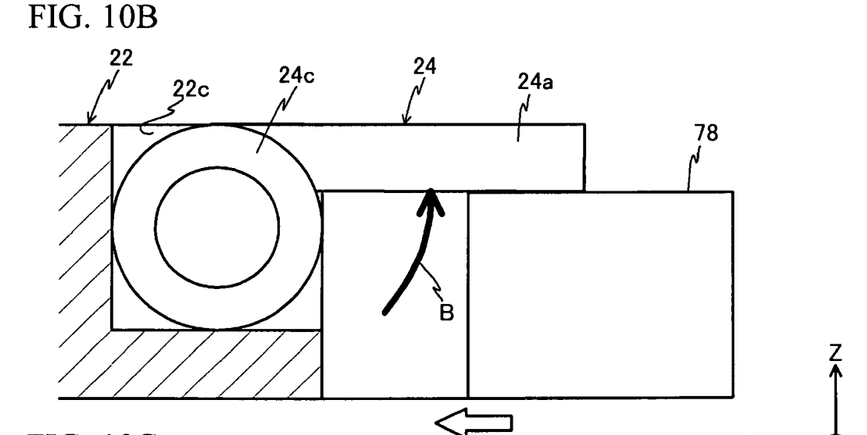
Figure 10C:
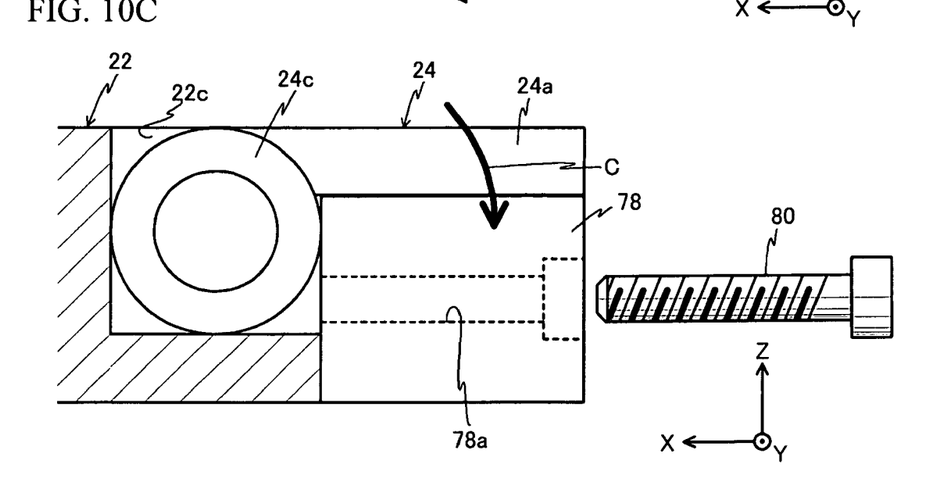

In the smartphone 100 of this embodiment, press fit plungers (77a and 77b) depicted in FIGS. 9A through 9C are provided between the first housing 11 and the second housing 12, so as to increase the user friendliness when the states are changed among the first through sixth states. Also, various measures are taken in the attachment of the open/close hinge attachment unit 24, as depicted in FIGS. 10A through 10C.

The press fit plungers (77a and 77b) depicted in FIGS. 9A through 9C are a hemispherical convex portion 77a provided in the vicinity of the −X-side end portion of the +Z-side face of the first housing 11, and a cup-like concave portion 77b provided in the vicinity of the −X-side end portion of the −Z-side face of the second housing 12. The press fit plungers (77a and 77b) are provided in pair, with a predetermined distance being kept in between in the Y-axis direction.

The convex portion 77a is placed at a position shifted to the +X side from the −X-side end portion of the first housing 11 by a predetermined distance L. The concave portion 77b is also formed at a portion shifted to the +X side from the −X-side end portion of the second housing 12 by the predetermined distance L. Accordingly, when the first housing 11 and the second housing 12 are not located at the same position as depicted in FIGS. 9A and 9B, the X-position of the convex portion 77a and the X-position of the concave portion 77b differ from each other. When the first housing 11 and the second housing 12 are stacked as depicted in FIG. 9C, the X-position of the convex portion 77a and the X-position of the concave portion 77b are the same, and the convex portion 77a is engaged with the concave portion 77b.

With the press fit plungers (77a and 77b) being provided in this manner, appropriate suction force can be felt by the engagement of the convex portion 77a with the concave portion 77b, when a state transition from the state depicted in FIG. 9A to the state depicted in FIG. 9C is caused. Also, small engagement force is caused between the first housing 11 and the second housing 12 by the engagement between the convex portion 77a and the concave portion 77b.

The press fit plungers may not be provided between the first housing 11 and the second housing 12, and may be provided between the second housing 12 and the third housing 13, instead. In this case, appropriate suction force can also be felt when the second housing 12 slides with respect to the third housing 13, and small engagement force can be caused between the second housing 12 and the third housing 13.

Next, the method of attaching the open/close hinge attachment unit 24 illustrated in FIGS. 10A through 10C is described.

First, as depicted in FIG. 10A, the open/close hinge attachment unit 24 is positioned to the first housing main body 22. Here, the positioning is performed so that the upper face of the plate-like portion 24a of the open/close hinge attachment 24 forms a predetermined angle (10°, for example) with respect to the upper face of the first housing main body 22.

In this situation, the hinge modules 28a and 28b (see FIG. 4) are inserted into the attachment portions 24b and 24c. In this manner, the state of the open/close hinge attachment unit 24 depicted in FIG. 10A is set at an initial angle.

As depicted in FIG. 10B, a spacer 78 is then inserted to the portion below the plate-like portion 24a, while pressing force is applied so that the upper face of the plate-like portion 24a and the upper face of the first housing main body 22 are set on the same plane. The spacer 78 has such a shape that can fill the space existing below the plate-like portion 24a (for example, the length of the spacer 78 in the Y-axis direction is made equal to the length of the plate-like portion 24a in the Y-axis direction).

As depicted in FIG. 10C, the spacer 78 is fixed to the first housing main body 22 with bolts 80 (in the same number as the number of round holes 78a) through the round holes 78a formed in the spacer 78 (for example, three round holes 78a are formed at predetermined intervals in the Y-axis direction).

As described above, in this embodiment, the initial angle is set in the state depicted in FIG. 10A (the state where there is a 10° tilt). Accordingly, in the state depicted in FIG. 10C, the force directed in the direction of the arrow C acts on the open/close hinge attachment unit 24, by virtue of the recovery force of the hinge modules 28a and 28b to the original positions.

In this embodiment, the above method of attaching the open/close hinge attachment unit 24 is employed. Accordingly, the force directed in the direction of the arrow C is applied to the open/close hinge attachment unit 24 in a horizontal state, so that appropriate suction force can be felt by the open/close hinge attachment unit 24.

Figure 11:
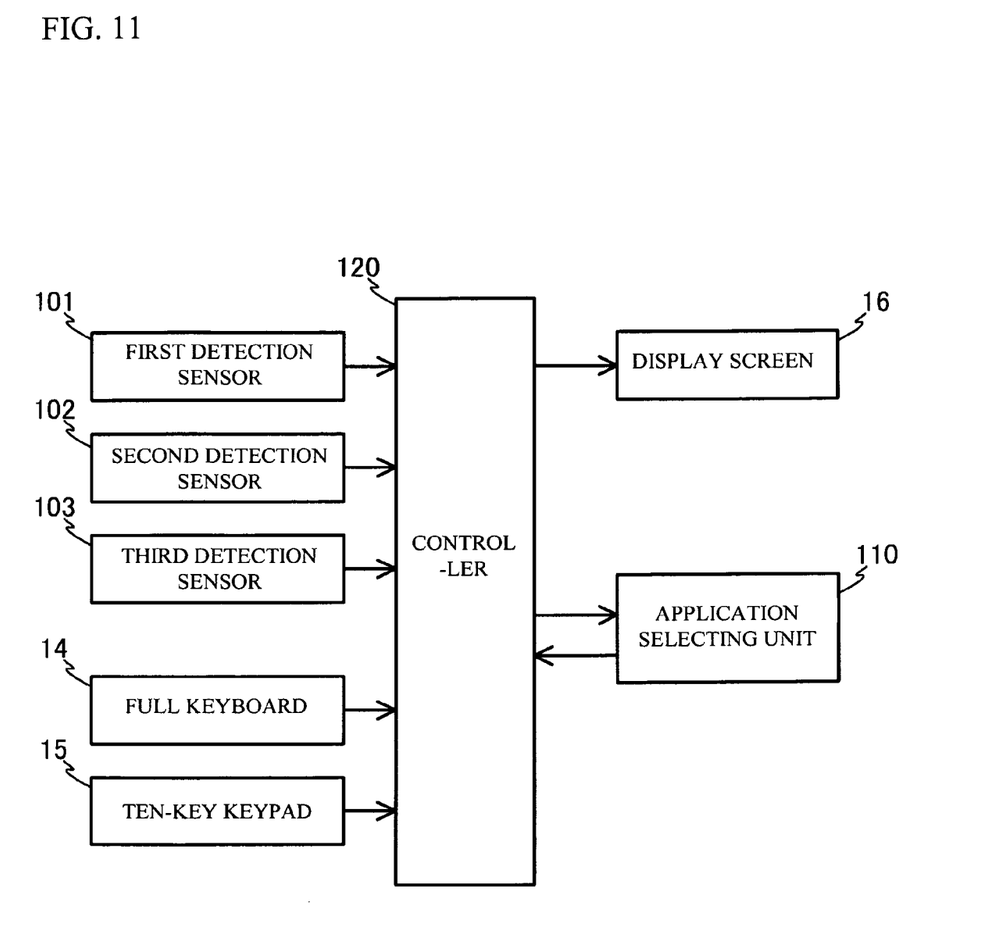
FIG. 11 is a block diagram of a control system for automatic application activation in accordance with the embodiment.

FIG. 11 is a block diagram of a control system for automatic application activation in the smartphone 100 of this embodiment.

As depicted in FIG. 11, the control system for automatic application activation in accordance with this embodiment includes a controller 120, a first detection sensor 101, a second detection sensor 102, a third detection sensor 103, an application selecting unit 110, and the display screen 16.

Figure 12A:
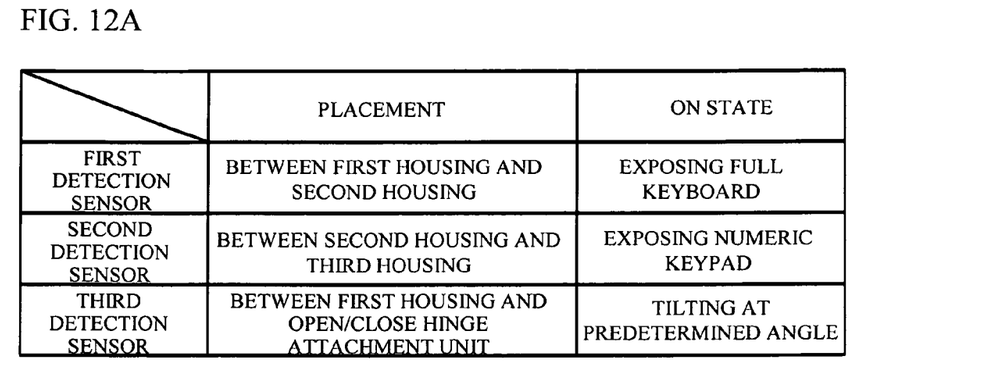
FIGS. 12A and 12B are tables for explaining the arrangement and functions of the first through third detection sensors, and an application selecting method based on detection results.

As depicted in FIG. 12A, the first detection sensor 101 is a sensor that is placed between the first housing 11 and the second housing 12, and detects the state where the full keyboard 14 is exposed as depicted in FIG. 1B (a sensor that is turned on when the full keyboard 14 becomes exposed). The first detection sensor 101 may be formed with a combination of a Hall sensor or a reed switch provided on one of the first housing 11 and the second housing 12, and a permanent magnet provided on the other one of the first housing 11 and the second housing 12. Therefore, the permanent magnet and the Hall sensor (or the reed switch) should be arranged at such positions that the permanent magnet and the Hall sensor (or the reed switch) face each other when the full keyboard 14 is exposed.

As depicted in FIG. 12A, the second detection sensor 102 is a sensor that is placed between the second housing 12 and the third housing 13, and detects the state where the ten-key keypad 15 is exposed as depicted in FIG. 1C (a sensor that is turned on when the ten-key keypad 15 becomes exposed). The second detection sensor 102 may be the same type of sensor as the first detection sensor 101.

As depicted in FIG. 12A, the third detection sensor 103 is a sensor that is placed between the first housing 11 and the open/close hinge attachment unit 24, and detects the state where the open/close hinge attachment unit 24 (together with the second housing 12) tilts by a predetermined angle with respect to the first housing 11 as depicted in FIG. 2B (a sensor that is turned on when the open/close hinge attachment unit 24 tilts by the predetermined angle). The third detection sensor 103 may be the same type of sensor as the first and second detection sensors 101 and 102.

Figure 12B:
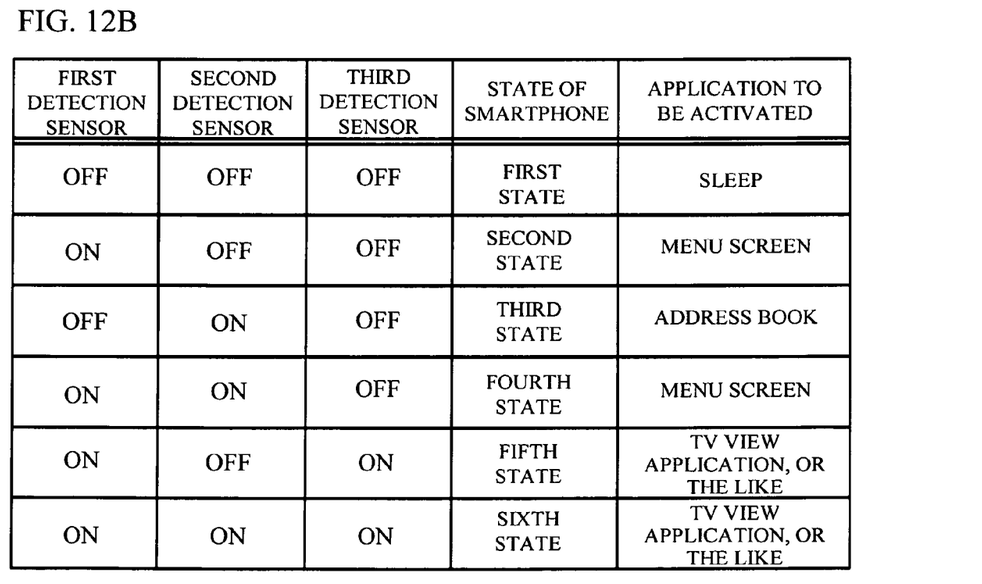

The application selecting unit 110 selects an application, based on the results of detections performed by the first through third detection sensors 101 through 103. For example, if all the sensors 101 through 103 are OFF, the smartphone 100 is in the first state depicted in FIG. 1A, as depicted in FIG. 12B. Therefore, the application selecting unit 110 selects an application (such as a sleep or power saving mode) associated with the first state in advance, and transmits the selection result to the controller 120. In a case where only the first detection sensor 101 is ON, the smartphone 100 is in the second state depicted in FIG. 1B. Therefore, the application selecting unit 100 selects an application (such as a menu screen) associated with the second state in advance, and transmits the selection result to the controller 120. In a case where only the second detection sensor 102 is ON, the smartphone 100 is in the third state depicted in FIG. 1C. Therefore, the application selecting unit 100 selects an application (such as an address book) associated with the third state in advance, and transmits the selection result to the controller 120. In a case where only the first detection sensor 101 and the second detection sensor 102 are ON, the smartphone 100 is in the fourth state depicted in FIG. 2A. Therefore, the application selecting unit 100 selects an application (such as a menu screen) associated with the fourth state in advance, and transmits the selection result to the controller 120. In a case where only the first detection sensor 101 and the third detection sensor 103 are ON, the smartphone 100 is in the fifth state depicted in FIG. 2B. Therefore, the application selecting unit 100 selects an application (such as a TV view application) associated with the fifth state in advance, and transmits the selection result to the controller 120. In a case where all the sensors 101 through 103 are ON, the smartphone 100 is in the sixth state depicted in FIG. 2C. Therefore, the application selecting unit 100 selects an application (such as a TV view application) associated with the sixth state in advance, and transmits the selection result to the controller 120.

The controller 120 activates an application, based on the selection result transmitted from the application selecting unit 110. The controller 120 also displays a page of the application on the display screen 16.

In this embodiment, the above control is performed, so that the user can change the smartphone 100 in form, and automatically activate an application highly likely to be used. Accordingly, the user friendliness can be increased.

As for the application corresponding to each state (each detection result), it is possible to set beforehand an application that is considered to be used frequently in each state (an application that is highly likely to be used), when the smartphone 100 is shipped out. It is also possible for the user to set or change the application corresponding to each state through the full keyboard 14 or the ten-key keypad 15. In this case, the controller 120 changes the application set by the application selecting unit 110, based on an input made by the user.

In this embodiment, the activating unit claimed in the claims is formed with the controller 120 and the application selecting unit 110, and the setting unit claimed in the claims is formed with the controller 120.

As described so far in detail, in accordance with this embodiment, the second housing 12 can slide in the X-axis direction with respect to the first housing 11. When the second housing 12 slides to expose the full keyboard 14, the open/close hinge attachment unit 24 rotates so that the second housing 12 can tilt with respect to the first housing 11. The third housing 13 can slide in the Y-axis direction with respect to the second housing 12. Accordingly, the smartphone 100 can transit among various states (forms), depending on the combination of one of the states where the second housing 12 covers the full keyboard 14, where the second housing 12 exposes the full keyboard 14, and where the second housing 12 exposes the full keyboard 14 and tilts, and one of the states where the third housing 13 covers the ten-key keypad 15 and where the third housing 13 exposes the ten-key keypad 15. With this arrangement, the user can put the smartphone 100 into a compact state where the full keyboard 14 and the ten-key keypad 15 are hidden, or a state (form) appropriate for use.

In this embodiment, the slider 42 of the horizontal slide mechanism 36 of the second housing 12 is fixed to the open/close hinge attachment unit 24. Accordingly, it is readily form a structure that restricts tilting of the second housing 12 when the second housing 12 covers the full keyboard 14, and allows the second housing 12 to tilt only when the full keyboard 14 is exposed.

Further, in this embodiment, the full keyboard 14 and the ten-key keypad 15 are provided. Accordingly, the user can cause the full keyboard 14 or the ten-key keypad 15 to be exposed, and use the full keyboard 14 or the ten-key keypad 15, depending on which application is to be used. For example, when the application to be used is an application that can be easily seen on a landscape-oriented screen and requires many keys on the ten-key keypad 15, like a spreadsheet application, the smartphone 100 is put into the fourth state (FIG. 2A) or the sixth state (FIG. 2C), so as to increase the operability. In a case where the channels are to be changed directly from the ten-key keypad 15 or a video chapter is to be input directly from the ten-key keypad 15 when a TV program or a video is being viewed, the smartphone 100 is also put into the fourth state or the sixth state, so as to achieve excellent operability. Further, in this embodiment, when the smartphone 100 is carried around (when the ten-key keypad 15 and the full keyboard 14 are not used at all), the ten-key keypad 15 and the full keyboard 14 can be housed inside, and the smartphone 100 can have a compact form. Accordingly, the smartphone 100 can be easily carried around, and excellent operability can be achieved. Depending on the model, emphasis is put on the use of the numerical keypad, rather than on phone calls. In such a case, the keys on the ten-key keypad 15 or the numerical characters on the keys may be arranged, so that the keys and the numerical characters can be easily seen in the fourth state and the sixth state. It is also possible to provide a mechanism that enables the ten-key keypad 15 to rotate at least 90°, so that the ten-key keypad 15 can be rotated by the mechanism in accordance with the purpose of use.

Further, in this embodiment, the smartphone 100 includes the first detection sensor 101 that detects the positional relation between the first housing 11 and the second housing 12, the second detection sensor 102 that detects the positional relation between the second housing 12 and the third housing 13, and the third detection sensor 103 that detects the position of the open/close hinge attachment unit 24 with respect to the first housing 11. Based on the detection results from the detection sensors, the application selecting unit 110 and the controller 120 activate an application. Accordingly, the user can activate a particular application at the same time as changing the form of the smartphone 100. Thus, the operability of the smartphone 100 can be increased.

The information terminal of this embodiment of the present invention has been described so far as a smartphone. However, the present invention is not limited to that, and the present invention may be applied to some other information terminal device such as a portable telephone device, a PHS terminal, or a PDA.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An information terminal device comprising:
    a first housing that has a first operating unit on a face on one side thereof;
    a hinge member that is designed to rotate about a first axis, with respect to the first housing;
    a second housing that has a second operating unit on a face on one side thereof, is provided on one side of the first housing, slides in a direction of a second axis perpendicular to the first axis, and transits between a state where the second housing covers the first operating unit of the first housing and a state where the first operating unit is exposed, the second housing restricting rotation of the hinge member through contact with the first housing when the second housing is in the state where the second housing covers the first operating unit of the first housing; and
    a third housing that has a display unit on a face on one side thereof, is provided on one side of the second housing, slides in the direction of the first axis, and transits between a state where the third housing covers the second operating unit of the second housing and a state where the second operating unit is exposed.

2. The information terminal device as claimed in claim 1, wherein
    the second housing includes a housing main body, a rail unit that is provided on the housing main body and extends along the second axis, and a moving unit that makes relative movement along the rail unit; and
    the moving unit is fixed to the hinge member.

3. The information terminal device as claimed in claim 1, wherein:
    the first operating unit includes a full keyboard; and
    the second operating unit includes a ten-key keypad.

4. The information terminal device as claimed in claim 1, further comprising:
    a detecting unit that detects at least one of a positional relation between the first housing and the second housing, a positional relation between the second housing and the third housing, and a position of the hinge member with respect to the first housing; and
    an activating unit that activates an application, based on a result of the detection by the detecting unit.

5. The information terminal device as claimed in claim 1, further comprising
    a setting unit that sets an application corresponding to the result of the detection, based on an input from the first operating unit and/or the second operating unit.

6. The information terminal device as claimed in claim 1, which transits between a state where the first operating unit and the second operating unit are both covered with the second housing and the third housing, and a state where the first operating unit and the second operating unit are both exposed and the first housing and the second housing are capable of tilting with respect to the third housing.

* * * * *